United States Patent [19]

Kanashige et al.

[11] Patent Number: 5,060,512
[45] Date of Patent: Oct. 29, 1991

[54] LIQUID LEVEL DETECTING APPARATUS

[75] Inventors: Masanori Kanashige, Yokohama; Kenji Okada, Tokyo; Michihiro Kumagai, Hamakita, all of Japan

[73] Assignees: Nippon Oil Co., Ltd., Tokyo; Nippon Automation Co., Ltd., Hamakita, both of Japan

[21] Appl. No.: 551,248

[22] Filed: Jul. 11, 1990

[30] Foreign Application Priority Data

Jul. 13, 1989 [JP] Japan ................................. 1-179169

[51] Int. Cl.⁵ ............................................ G01F 23/14
[52] U.S. Cl. ...................................... 73/301; 73/721; 340/614; 340/618
[58] Field of Search ........................ 73/301, 299, 721; 340/614, 618

[56] References Cited

U.S. PATENT DOCUMENTS

| 3,638,481 | 2/1972 | Wilner | 73/301 |
| 3,840,867 | 10/1974 | Welk, Jr. | 340/614 |
| 4,459,584 | 7/1984 | Clarkson | 340/618 |
| 4,491,016 | 1/1985 | Haefner | 73/301 |
| 4,768,377 | 9/1988 | Habelmann et al. | 340/618 |
| 4,916,950 | 4/1990 | Bergeson et al. | 73/301 |

Primary Examiner—William A. Cuchlinski, Jr.
Assistant Examiner—G. Bradley Bennett
Attorney, Agent, or Firm—Fish & Richardson

[57] ABSTRACT

Disclosed in a liquid level-detecting apparatus, in which a pressure of a liquid stored in a tank at a predetermined position is detected by a pressure sensor, the detected pressure is converted to an electric signal, and this electric signal is transmitted to the outside as a liquid level information based on the liquid head pressure.

4 Claims, 2 Drawing Sheets

FIG. I
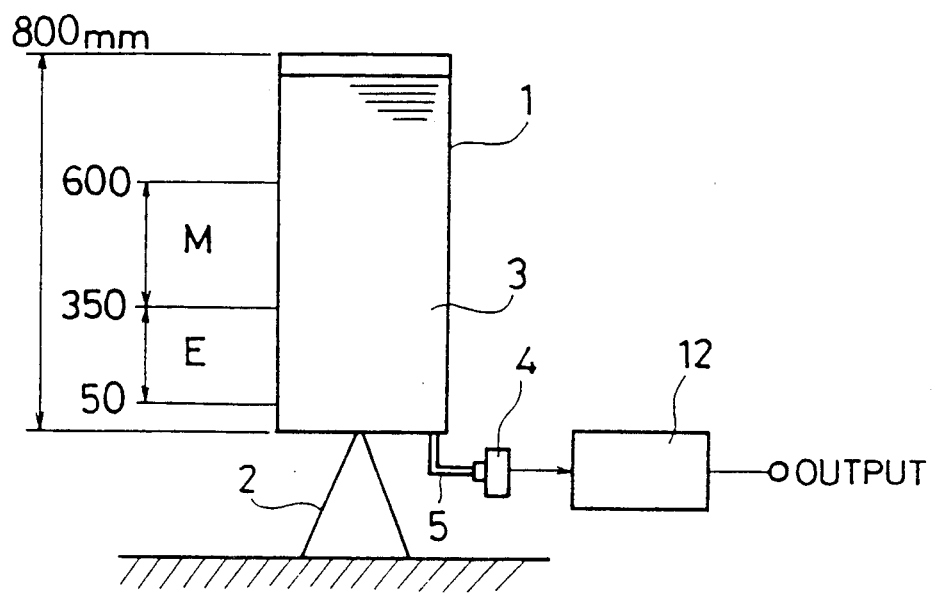
FIG. 2
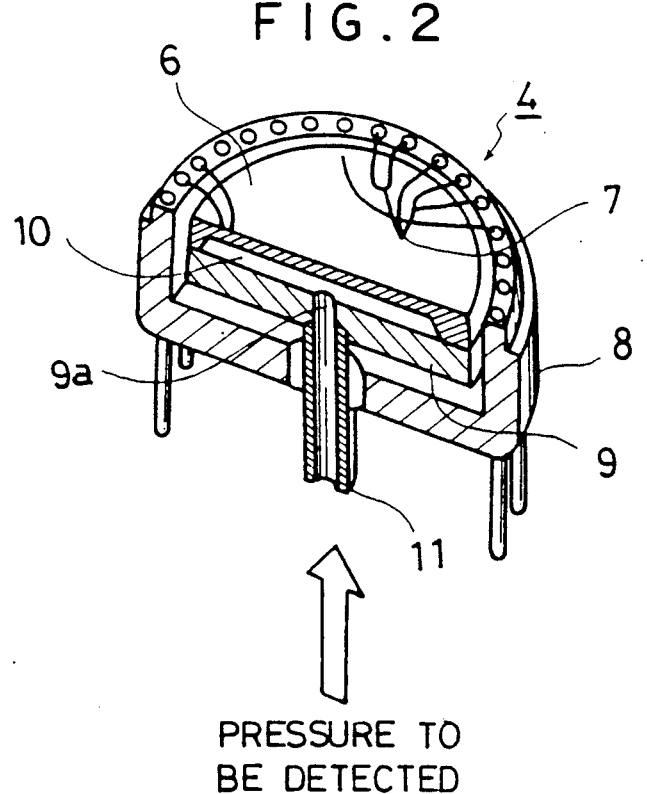
PRESSURE TO
BE DETECTED

LIQUID LEVEL DETECTING APPARATUS

BACKGROUND OF THE INVENTION

1. Field of the Invention

The present invention relates to an apparatus for detecting the level of a liquid stored in a tank. More particularly, the present invention relates to a liquid level-detecting apparatus for detecting a liquid head pressure by a pressure sensor and transmitting the liquid head pressure as a liquid level information to the outside.

2. Description of the Related Art.

As a liquid level-detecting apparatus for detecting the level of a liquid stored in an outdoor store tank or the like and transmitting a liquid level information to the outside, there is known a liquid level gauge having a float switch comprising a control switch which is actuated at a predetermined position in response to a float set on the surface of a liquid.

However, this conventional float switch type liquid level gauge involves various problems as described below.

The float switch is arranged at a setting hole formed in the tank proper and the liquid level that can be detected is determined solely by the setting position of the float switch, so that, an alternate liquid level cannot be detected.

Furthermore, once the float switch is set at a fixed position on the wall of the tank, even if it is desired to change the position of detection of the liquid level, it is very difficult to freely change the setting position.

Moreover, since the float switch is arranged at the setting hole formed in the tank proper as pointed out above, the shape or kind of the tank proper may result in a place where setting of the float switch is not allowed, or the setting position is limited, so that the use of the apparatus is limited.

SUMMARY OF THE INVENTION

Under the above-mentioned background, it is a primary object of the present invention to provide a liquid level-detecting apparatus which permits alternate liquid levels to be freely detected and can be easily set regardless of the shape and kind of a tank proper.

In accordance with the present invention, this object can be attained by a liquid level-detecting apparatus, which comprises a pressure sensor having a detecting part arranged so that the detecting part can be exposed to a liquid stored in a tank to detect a liquid head pressure, convert the detected pressure to an electric signal and emit the electric signal, and juding and transmitting means for transmitting the electric signal emitted from the pressure sensor as a liquid level information.

In the liquid level-detecting apparatus having the above-mentioned structure, the pressure sensor detects a liquid head pressure and converts the detected liquid head pressure to a corresponding electric signal, and emits the electrical signal to the transmitting means. The transmitting means transmits the received electric signal as a liquid level information to the outside.

Accordingly, the liquid head pressure information can be known on the outside, and since the liquid head pressure is in proportion to the height of the level of the liquid, an alternate level of the liquid in the tank can be known. Furthermore, it can be known that the level of the liquid in the tank arrives at one specific position or any of a plurality of specific positions in the tank.

It is preferred that the pressure sensor be arranged and connected so that the detecting part is exposed to a pressure introduction pipe connected to the bottom of the tank. If this arrangement is adopted, it is not necessary to attach the pressure sensor to the tank proper, and the attachment position is not restricted the the shape or kind of the tank proper.

A semiconductor pressure sensor utilizing a piezoresistance effect, such as a silicon semiconductor, can be used as the pressure sensor. In this semiconductor pressure sensor, there is no substantial change with the lapse of time, and the pressure sensor is stable for a long time and has a high pressure sensitivity. Moreover, the output signal processing can be easily performed, the semiconductor pressure sensor has a small size and a light weight, and mass production and reduction of the cost become possible.

The judging and transmitting means can be constructed by an amplifier for amplifying the electric signal emitted from the pressure sensor, a judging circuit for inspecting the electric signal, comparing the electric signal with a reference electric signal corresponding to a predetermined liquid level and judging the emission of an electric signal corresponding to the predetermined liquid head pressure, and an output circuit for putting out the result of the judgement. By this construction, it can be known that the liquid in the tank reaches a predetermined level or any of a plurality of predetermined levels.

In this construction, the judging circuit can comprise setting means for dividing the region from a predetermined level to a full liquid level in the tank into a plurality of levels, setting a plurality of liquid levels to be detected between adjacent divided levels and putting out an electric signal coresponding to each set level as a reference signal. If this setting means is arragned, one of a plurality liquid levels can be detected and a corresponding signal can be emitted, and since detecting devices need not be disposed for respective levels to be detected, the mechanism can be simplified.

If the judging circuit is actuated by a time-measuring timer circuit so that the liquid level is intermittently inspected at a predetermined time interval, it becomes unnecessary to continuously transmit liquid level information to the outside, and the power consumption required for the transmitting means can be controlled to a minimum level.

The present invention will now be described in detail with reference to an embodiment illustrated in the accompany drawings, from which the present invention will become apparent. However, the scope of the present invention is not limited by this embodiment, but the embodiment can be freely modified within the scope defined by the claims.

BRIEF DESCRIPTION OF THE DRAWINGS

FIG. 1 is a diagram illustrating the liquid level-detecting apparatus accordintg to the present invention.

FIG. 2 is a perspective view illustrating the basic structure of a semiconductor pressure sensor in the liquid level-detecting apparatus shown in FIG. 1.

DETAILED DESCRIPTION OF THE PREFERRED EMBODIMENT

Figure 3:
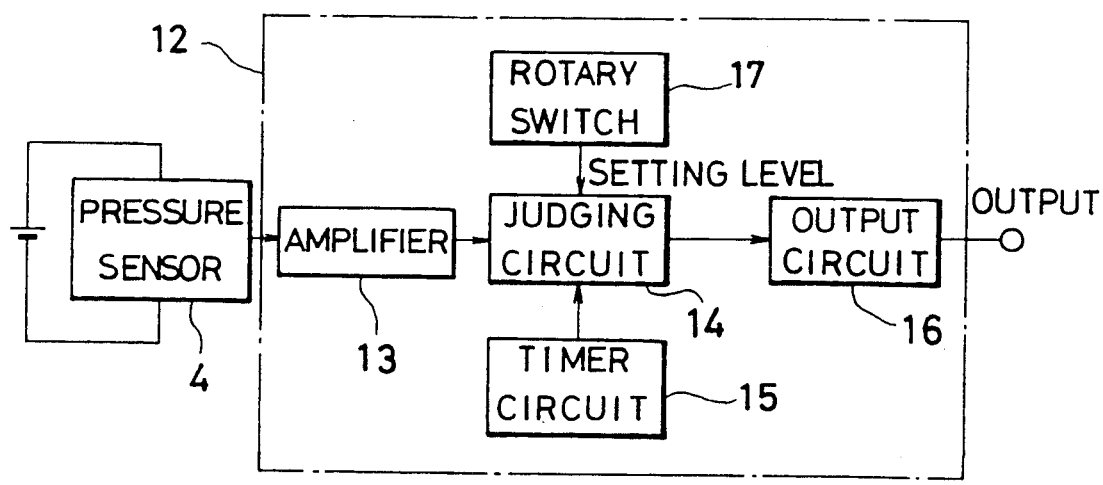
FIG. 3 is a block diagram illustrating the structure of a liquid level adjuster in the liquid level-detecting apparatus shown in FIG. 1.

FIG. 1 is a diagram illustrating the outline of the liquid level-detecting apparatus according to the present invention. A store tank 1 in which a liquid, for example, an oil such as kerosene, is stored is set outdoors and this tank 1 is supported by supporting legs 2. An oil 3 in the storing tank 1 is supplied into an oil burner (not shown) arranged in a room, for example, a portable stove.

In the store tank 1, there are disposed a pressure sensor 4 for detecting the liquid head pressure of the oil 3 stored in the store tank 1 and converting the detected pressure to an electric signal and a liquid level adjuster as the transmitting means for transmitting the electric signal emitted from the pressure sensor 4 as a liquid level information to the outside.

More specifically, a pressure introduction pipe 5 is connected to the bottom of the store tank 1 and a detecting part of the pressure sensor 4 is connected to this pressure introduction tube 5 so that the detecting part is exposed to the oil.

For example, a semiconductor pressure sensor can be used as the pressure sensor 4.

FIG. 2 is a perspective view illustrating the basic structure of the semiconductor pressure sensor.

A central part of a substrate composed of a silicon signal crystal is processed from the back surface to form a thin diaphragm 6, and a disk-shaped seat 9 is piled on the diaphragm 6 to form a space portion 10 between them. An integrated body comprising the diaphragm 6 and the seat 9 is fitted or bolted to a cavity formed in a package which is 8 fixed and attached to a fixing member. Several diffused resistor layers 7 in which an impurity (ordinarily, boron) is diffused are formed at an optimum position within the surface region of the diaphragm 6. A pressure induction pipe 11 is connected to the package 8 while piercing through the package 8. The top end of the pressure introduction pipe 11 is connected to a communicating hole 9a, so that the oil in the store tank 1 is introduced through pipe 11 into the space portion 10. The change of the resistance in the resistance layers 7, which is generated by the piezoresistance effect based on the strain produced in the diaphragm 6 according to the difference between the oil pressure and the atmospheric pressure on the surface of the diaphragm 6, can be taken out to the outside.

The emitted pressure detection signal is generally taken out as a change of the output voltage of a bridge circuit constructed by a pair or two pairs of selected diffused resistors.

The pressure introduction pipe 5 connected to the bottom of the store tank 1 is connected to the above-mentioned pressure introduction pipe 11.

This semiconductor pressure sensor is advantageous in that there is no substantial change with the lapse of time, the sensor is stable for a long time, the pressure sensitivity is high, the output signal can be easily processed, the sensor has a small size and a light weight, and mass production and reduction of the cost are possible.

The liquid head pressure detected by the above-mentioned pressure sensor 4 is taken out as a change of the output voltage, as mentioned above.

Figure 4:
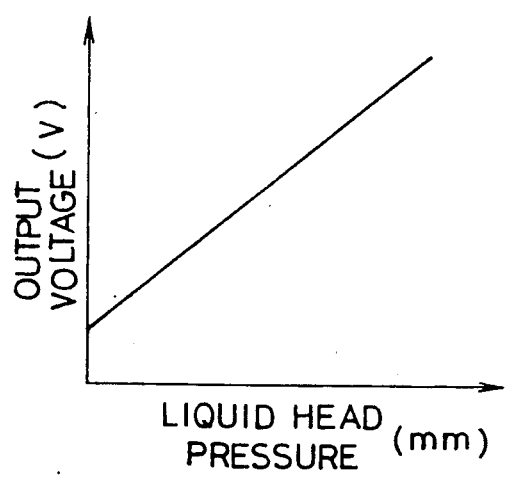
FIG. 4 is an output voltage/liquid head pressure curve shown in FIG. 2.

FIG. 4 is a characteristic curve illustrating the relation between the above-mentioned output voltage and the liquid head pressure.

By using this FIG. 4, the liquid level can be known from the output voltage value.

FIG. 3 is a block diagram illustrating the structure of the judging and transmitting means in the liquid level-detecting apparatus shown in FIG. 1.

The judging and transmitting means 12 comprises an amplifier 13 for amplifying the output voltage from the pressure sensor 4, a judging circuit 14 for comparing the output voltage of the amplifier 13 with a reference voltage value corresponding to a predetermined liquid level, a timer circuit 15 for measuring the timing of the juding circuit 14, and an output circuit 16 for putting out the result of the comparison and judgement. This means 12 exerts the following functions.

The full liquid level (for example, 800 mm) of the store tank 1 is divided into a low level (50 to 350 mm) and a high level (350 to 600 mm).

The judging and transmitting means 12 comprises two rotatry switches 17 (6 steps) as the means for setting a reference value, and in the region between the high level and the low level and the region between the low level and the zero level, liquid level reference values of the liquid level to be detected are set at intevals of 50 mm and corresponding voltage signals are put out from the judging circuit 14.

At every two high and low levels, the judging circuit 14 judges based on the characteristic curve of FIG. 4 that reference output voltages as the liquid head pressure corresponding to a plurality of the liquid levels set by the two rotary switches 17 are generated. The judging circuit 14 transmits this judgement result to the output circuit 16, and the output circuit 16 transmits a signal to the outside. This judging circuit 14 is controlled by the timer circuit 15 to inspect the liquid level once an hour, and when the level of the liquid in the store tank 1 reaches the set reference value, the output circuit 16 emits a signal for 2 seconds to the outside. This emission is conducted only once at each of the above-mentioned high and low levels M and E.

If rotary switches 17 for setting a plurality of liquid levels to be detected at predetermined intervals in the liquid level of the tank 1 are thus arranged in the judging circuit 14, it becomes necessary to dispose liquid level-detecting apparatuses for respective levels to be detected, and the mechanism can be simplified.

Furthermore, since the time-measuring timer circuit 15 is connected to the judging circuit 14 so that the liquid level is intermittently inspected at predetermined time intervals, it becomes unnecessary to continuously transmit a liquid level information to the outside, and the power consumption required for the judging the transmitting means can be controlled to a minimum level.

Each set liquid level is automatically reset when an oil is supplied onto the liquid surface in the store tank 1, and new liquid levels are set again.

In the above-mentioned manner, when the liquid surface reaches a predetermined liquid level, the information is transmitted to the outside, and the information can be effectively utilized by various devices.

For example, control of the remaining oil in the store tank 1 in a house can be performed based on this information, or the amount of the remaining oil based on this information can be utilized by a control center for controlling the oil supply and the information can be utilized for an oil supply plan.

In the liquid level-detecting apparatus of the present invention, the liquid level that can be detected is not limited to one specific level, but a plurality of alternate or predetermined liquid levels can be detected.

Furthermore, the pressure sensor 4 can be located at any position, for example, the bottom, in the store tank 1, at which the liquid head pressure can be detected. Therefore, it is not necessary to set the sensor 4 at a specific height in the tank 1, and the setting position of the sensor 4 is not restricted by the shape or kind of the tank proper 1 so that the applicability is increased.

Incidentally, the above-mentioned embodiment is constructed so that when the surface of the oil in the store tank 1 reaches a set liquid level, the information is transmitted to the outside. However, even a structrue in which information regarding levels of the oil in the tank 1 is transmitted perpetually and continuously is included within the scope of the present invention.

We claim:

1. A liquid-level detecting apparatus for detecting the liquid level in a tank divided into a plurality of regions, which comprises a pressure-detecting means for detecting a liquid pressure and converting the detected pressure to an electric signal, a detecting part of which is exposed to a liquid in a tank, setting means for setting a plurality of predetermined liquid levels in each region in the tank and putting out reference electric signals corresponding to the set plurality of predetermined liquid levels, judging means for inspecting the electric signal output from the detecting means at predetermined time intervals and judging the electric signal output from the detecting means with respect to each of the reference electric signals, and output means for outputting a signal indicative of the result of the judgement by the judging means.

2. A liquid level-detecting apparatus as set forth in claim 1, wherein the pressure-detecting means is connected to a pressure introduction pipe connected to the bottom of the tank to detect the pressure in the pressure introduction pipe.

3. A liquid level-detecting apparatus as set forth in claim 1, wherein the pressure-detecting means comprises a semiconductor pressure sensor utilizing a piezoresistance effect of a semiconductor.

4. A liquid level-detecting apparatus as set forth in claim 1, wherein a time-measuring timer circuit is connected to the judging means to inspect the liquid level intermittently at predetermined time intervals.

* * * * *